April 29, 1947.   R. P. CASSELL   2,419,764
METHOD OF MOLDING GLASS ARTICLES
Filed Dec. 17, 1943   3 Sheets-Sheet 1
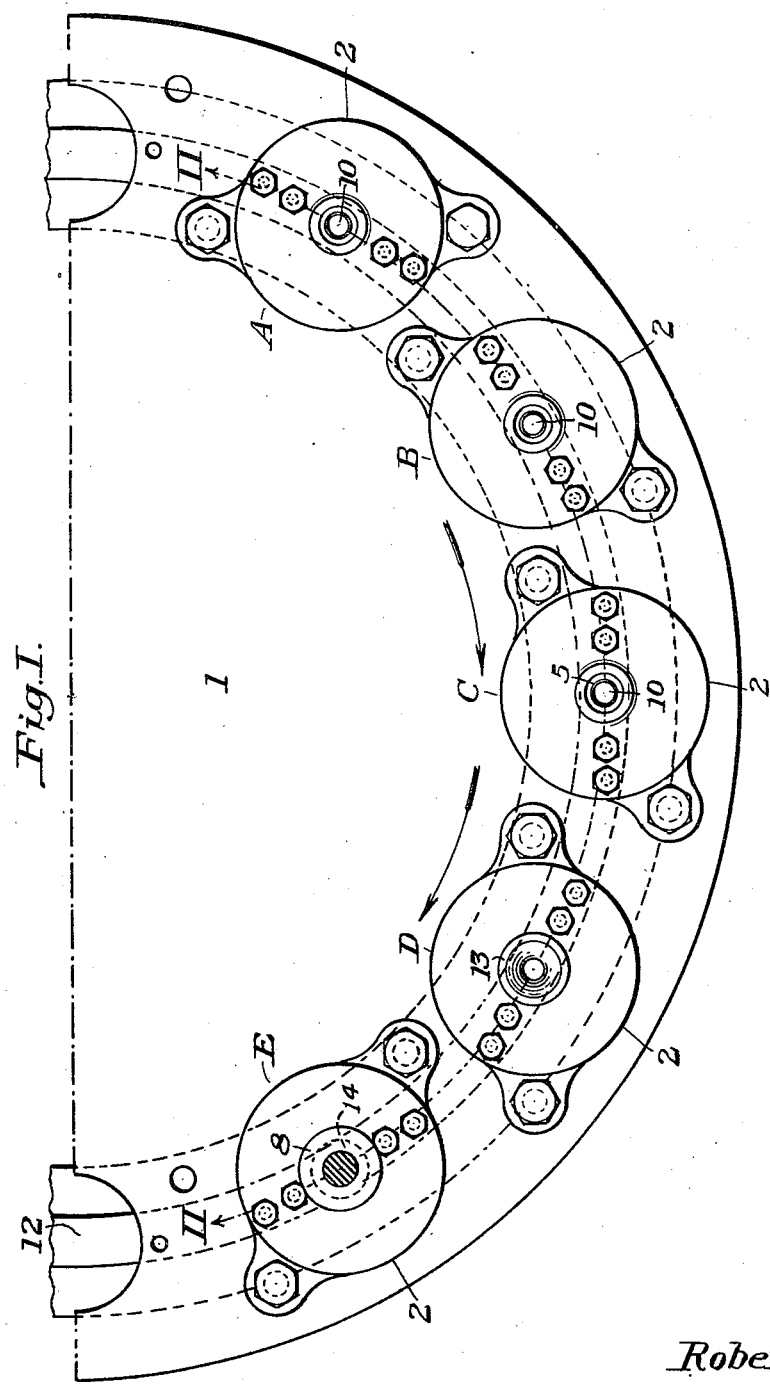
INVENTOR
Robert P. Cassell
by William B. Wharton
his attorney April 29, 1947.   R. P. CASSELL   2,419,764
METHOD OF MOLDING GLASS ARTICLES
Filed Dec. 17, 1943   3 Sheets-Sheet 2
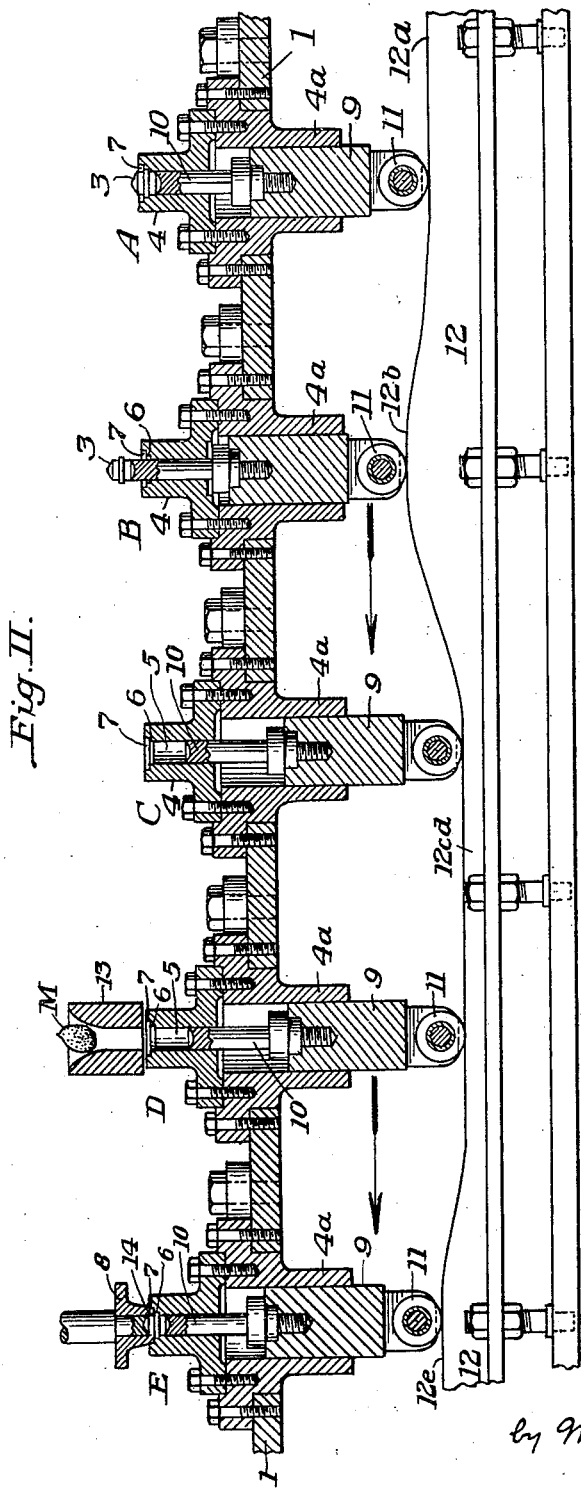
INVENTOR
Robert P. Cassell
by William B. Wharton
his attorney April 29, 1947. R. P. CASSELL 2,419,764
METHOD OF MOLDING GLASS ARTICLES
Filed Dec. 17, 1943 3 Sheets-Sheet 3
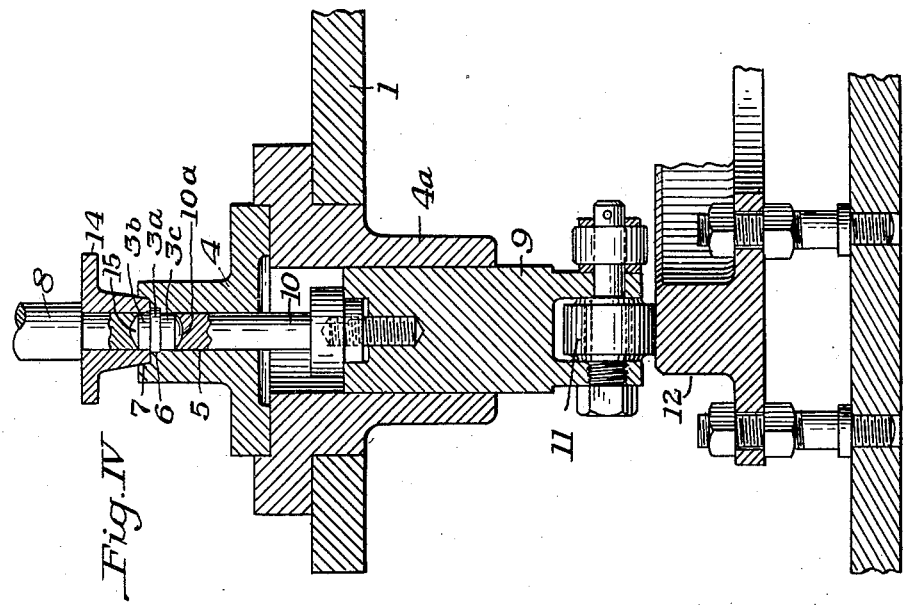
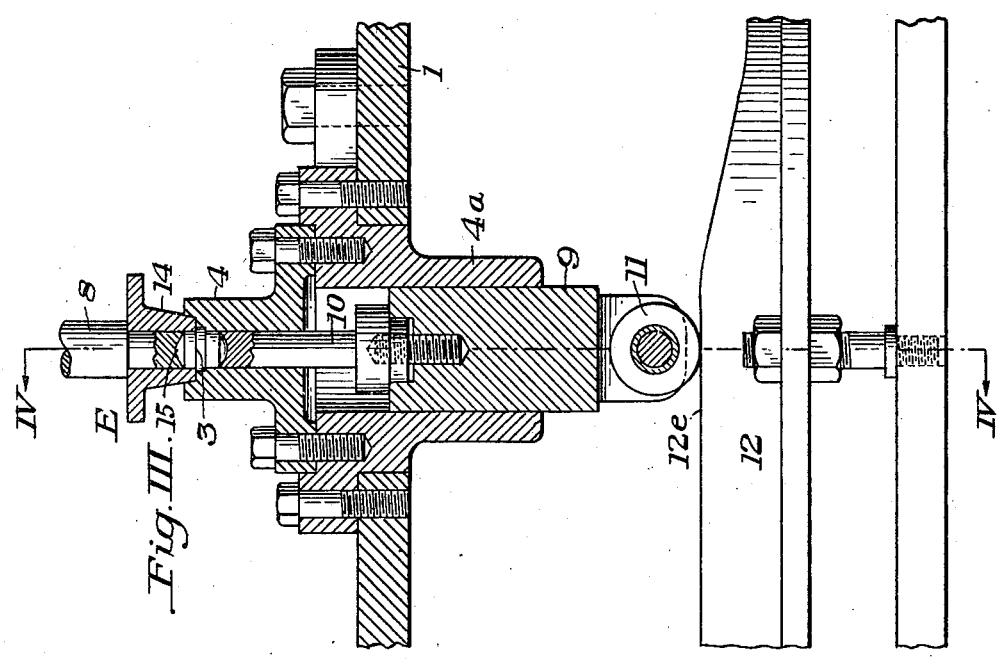
INVENTOR
Robert P. Cassell
by William B. Wharton
his attorney Patented Apr. 29, 1947

2,419,764

UNITED STATES PATENT OFFICE 2,419,764

METHOD OF MOLDING GLASS ARTICLES

Robert P. Cassell, Jeannette, Pa., assignor to The Jeannette Glass Company, Jeannette, Pa., a corporation of Pennsylvania Application December 17, 1943, Serial No. 514,693

5 Claims. (Cl. 49—85)

1

This invention relates to a method of press-molding glass articles and particularly to a method of molding glass articles the relative shape an volume of which render the molding difficult.

The glass article to which this invention primarily is directed is a reflector button of the sort used in signs and markers disposed along roadways. Those buttons are exemplary of glass articles which are solid bodies of glass having an enlarged or flanged central portion and two additional body portions extended oppositely from the central portion of the body. In glass reflector buttons, the press-molding of which is illustrated, each of such articles has a laterally extended central region in the form of a flange, and two end or shank portions extended axially in opposite directions therefrom. In use of such a button, one of its shank portions serves for anchorage in a metal plate or the like which forms the base of the sign or marker. The flange provides a division line from which in mounted position there extends a rounded boss or button which chiefly provides the reflecting surface.

Considering such articles as exemplary, great difficulty is encountered in molding them automatically to form. The body is small and solid, thus comprising a relatively great weight and volume of glass with respect to its overall size, and the extended central region or flange presents a complication in the preparation of a mold cavity for press-molding the button. For this reason, such buttons have previously been made at considerable expense by molding the entire article to the extreme diameter of its central region, or flange, and then grinding down the two extended, or shank, portions to a diameter less than that of the flange.

The object of this invention is to provide a method by which reflector buttons of the sort described, and analogous glass articles, may be press-molded accurately and rapidly to their desired final form in automatic machines which are primarily of conventional structure, and in molds of simple design and arrangement.

The invention may best be understood by considering that specific article, namely a reflector button, as exemplary, and by reference to the accompanying drawings exemplary of apparatus embodiments in which the method of the invention may be practiced.

In the drawings:

Fig. I is a plan view of a rotary mold-carrying table arranged to be moved step by step, sequentially to index each of a plurality of molds carried by the table at a plurality of working stations; this figure of the drawings showing stations in which the novel steps of my method are performed, and showing molds arranged for the press-molding of glass articles in accordance with those novel steps the glass to be molded and the articles to be molded therefrom being omitted in this figure of the drawings.

Fig. II is taken in the plane of the arcuate section line II—II and shows a vertical sectional development of the mold-carrying table, molds thereon, and associated structure illustrating the movement and position of those elements in the same several stations shown in Fig. I; the steps of the process being illustrated in this figure of the drawings by showing the feeding of a mold charge at one of the stations to which the table is brought and the formation and discharge of the formed article at other stations; and this figure of the drawings also showing in elevation control means in the form of a cam-track arranged to actuate certain movable elements of the organization in such manner and with such timing as conforms to the method of the invention.

Fig. III is a vertical sectional view through the mold assembly and a fragmentary side elevation of a cam-track showing on an enlarged scale a mold assembly with its elements in the positions they assume in one of the stations, illustrated in Figs. I and II, to which each of the molds is indexed by movement of the mold-carrying table.

Fig. IV is a vertical sectional view through the said assembly illustrating the assembly taken in the plane of section line IV—IV of Fig. III, and position of elements occurring in the same station shown in Fig. III, but taken at right angles thereto, and showing the cam-track in cross-section.

The exemplary structure shown in the drawings comprises a circular mold-carrying table 1 which it is to be understood is rotated step by step through a plurality of forming stations appropriate to the press-molding of articles from mold charges of molten glass. Fig. I shows a plurality of mold assemblies 2 and illustrates the positioning of the molding assemblies at five stations to which each of the molds is indexed in step by step rotation of the mold-carrying table. These stations are designated respectively A, B, C, D, and E, and Fig. II of the drawings shows five like mold assemblies occupying the same several stations as in Fig. I. It is to be understood that the movement of the mold-carrying table is clockwise as is indicated in Fig. I, and the table movement in Fig. II is similarly from right to left of the sheet. The article molded, which is illustrated as reflector button 3, is shown in station A and in station B in Fig. II of the drawings. Referring particularly to Figs. III and IV of the drawings which show the mold assembly and the article molded on an enlarged scale, it will be seen that the molded article is a solid body of glass composed of a diametrically enlarged intermediate flange 3a and oppositely extended, axially arranged end portions 3b and 3c.

Referring to Fig. II of the drawings, station A is the final one of a plurality of cooling stations through several of which the article passes after it is molded. Station B is a discharging station for the article. Station C is a cooling station for the mold from which the article has been discharged, and a preparation station in which elements of the mold assembly are prepared for the reception of the next mold charge of molten glass. Station D is a feeding station in which a charge of molten glass is fed to the mold elements carried by or directly associated with the mold-carrying table 1. Station E is a forming station in which the article is formed to the desired shape by the cooperative action of the molding and pressing elements of the forming assembly.

Referring to the several figures of the drawings, the mold assembly consists primarily of a mold body or die 4 mounted on a flanged base 4a carried by rotary table 1. The formation of the die cavity is that of a circular bore 5 of uniform diameter throughout approximately its height, but at its upper end this bore is extended laterally in a region 6 to provide for the flange or lateral extension on the body to be molded, and above this lateral extension 6 there is a further extension 7 providing space and a seating shoulder for the forming head of a top forming plunger 8. In the mold base 4a below mold body or die 4 there is a bore of extended diameter in which is slidably mounted a stem 9 carrying bottom plunger 10. This plunger, or movable mold element, is slidable in the bore, or shank-forming cavity, 5 of the mold body or die. At its lower end stem 9 is provided with a roller 11 which rides on the surface of a cam-track 12. All the molds of the apparatus are identical in structure.

Considering first station A, in that station bottom plunger 10 is in its normal or forming position in which it provides the bottom element of the mold, and cooperates in defining the mold cavity. In this position, roller 11 on the stem of the bottom plunger rides on a surface 12a which may be considered to lie at the normal elevation for the cam-track. The formed article 3, which has been cooled preparatory to its discharge, lies in the cavity of the mold with the lower convex end of its shank portion 3c lying in the concave upper surface 10a of the bottom plunger. Flange 3a of the article lies in the lateral extension 6 adjacent the upper end of the die cavity, and its shank 3b extends upwardly beyond the upper end of the die.

To discharge the formed article 3 in station B, roller 11 of the plunger stem rides up to the surface 12b on an elevated lobe of the cam-track. This upward movement of stem 9 raises plunger 10 to its extreme upper position, in which it projects beyond the upper end of the die, throwing out or presenting for removal the article 3 which has been formed and cooled. It is to be understood that the use of a bottom plunger in the manner shown in station B primarily is conventional, it being common practice in the art to discharge formed articles from a mold by raising in the cavity of the mold a plunger, or bottom mold element.

It will be noticed that in station A the upper portion of the solid formed article projects beyond the upper level of the die. A sufficient weight and volume of molten glass to provide the mold charge for such article cannot, therefore, satisfactorily be received in a die cavity dimensioned as shown in station A, because the fluid glass of the mold charge would tend to spread into extension 7 in which the top plunger of the pressing assembly is received, and would tend to slop over the edge of the mold. This problem I solve by making the shank-forming portion, or bore, of the mold cavity of relatively great vertical extent and by so increasing the effective depth and volume of the die cavity that it can accommodate a complete mold charge. This I do by causing retraction of plunger 10 to a position below its forming position in the main shank-forming region, or bore, 5 of the mold cavity. In the exemplary means illustrated, the plunger is retracted by causing roller 11 on plunger stem 9 to ride down from lobe 12b of the cam-track to a depressed region 12cd which lies at a level below the normal forming level of region 12a. Station C shows the mold assembly in this position with plunger 10 retracted to increase the effective depth and volume of the die cavity. This station serves as a preparatory station in which the mold elements are brought into feeding position and are cooled to a temperature suitable for contact with the charge of molten glass.

From station C the mold assembly is indexed to feeding station D, the roller 11 of the plunger stem still riding in the depressed region 12cd of the cam-track. In station D, plunger 10 thus still remains in its retracted position assumed in station C, as the bottom of a mold cavity of increased depth. Into this cavity a mold charge M, as indicated in Fig. II of the drawings, is fed to the mold body or die through a funnel 13.

To form the article, and after the mold charge has been fed to the die, I define in the press-molding assembly a completely closed cavity which includes a cavity in the head of top forming plunger 8 and which is shaped and dimensioned suitably for forming the desired article. The procedure of so doing will be described as it may be performed in the exemplary apparatus shown and described.

As the mold containing mold charge M is indexed forward from station D to station E, roller 11 on plunger stem 9 rides up to a region 12e of the cam-track which is at the level of the cam-surface 12a at station A. This raises bottom plunger 10 into forming position in which it provides the bottom of a mold cavity dimensioned appropriately to the formation of the desired article. As bottom plunger 10 rises, top plunger 8 descends to a position in which its annular nose 14 lies in the shoulder of extension 7 in the mold body, and the cavity 15 in the head of the plunger receives that portion of the mold charge which projects beyond the upper level of bore 5 and extension 6 in the mold cavity. It will be noticed that station E is located very close to the top of the rise leading to cam-surface 12e so that travel of the mold-carrying table and of the mold which has received the mold charge ends at the instant bottom plunger 10 reaches its forming position. Although top plunger 8 cannot be positioned on the horizontally moving mold assembly until that assembly is at rest, it may begin its downward movement before movement of the mold ceases. Thus bottom plunger 10 reaches its upper cooperative position in mold body 4, and top plunger 8 reaches its lower cooperative position on mold body 4 approximately simultaneously to define the cavity in which the article is formed.

The article having been formed, pressing plunger 8 is retracted in usual manner, and the mold with the formed article therein is indexed to a cooling station, or stations. It has been assumed above that the table indexes the molds at but one forming station in each complete revolution of the table, the surfaces 12a and 12e being regions at the ends of a uniformly elevated arcuate region of the cam-track. When, however, small articles such as the exemplary reflector button, are molded, it frequently is possible to repeat the method of the invention in each revolution of the exemplary mold-carrying table, by providing more than one top plunger and by repeating the cam contour which gives determinate movement to the bottom plunger.

It will be seen that the essential steps of the method are to increase the volume of the die cavity by increasing its depth from the bottom so that it can accommodate a mold charge comprising a greater weight and volume of molten glass than would otherwise be possible and then press-molding the glass while restoring the dimension of the die cavity in the die itself and effectively extending the volume of the total mold cavity by providing for flow of the charge into a cavity provided in the pressing instrumentality which is cooperative with the die. In the exemplary organization shown for forming the specific article taken as exemplary, an extension of the mold cavity is provided in forming position of the elements to give a concave end surface to the shank of the article formed in that region of the mold. This, however, is specific in its nature and is appropriate to the specific article taken as illustrative. Since the main portion of the mold cavity, i. e., the cavity 5 in die 4, is capable of forming structure in the nature of a shank, leg, boss, or the like, it is unnecessary that such cavity be provided as in the upper face of a bottom plunger. The upper surface of the bottom plunger may be flat, convex, or may bear any suitable design, as is appropriate to the specific article which is formed. It is, however, essential that a cavity for upward flow of the mold charge be provided in the pressing instrumentality; that is, in the head of a pressing plunger or in some adjunct structure associated with the plunger, as well as that the bottom plunger be arranged for vertical retraction below its forming position in the die cavity.

The method of the invention as illustrated is performed in a rotary glass-forming machine in which each of the molds is indexed at a circularly arranged sequence of stations, and a specific molding and pressing organization is shown and described. It is, however, to be understood that the method of my invention may be performed in apparatus of various other types and in molding and pressing organizations differing widely from the one herein shown and described. The essentials of the method have been above given, and as indicated, the method itself is susceptible of substantial variation in its performance.

The disclosure of apparatus embodiment for performing my method being exemplary and the disclosure of the method steps herein made being in measure exemplary, I do not intend to limit my invention to means utilized in performing the method; nor to the specific performance of the method herein disclosed other than by the definition of the claims appended hereto.

I claim as my invention:

1. In the press-molding of a glass article which comprises a laterally extended intermediate portion with two end or shank portions extended oppositely therefrom; the herein-described method of molding such article in a mold assembly comprising a die having therein one shank-molding cavity and at the open upper end thereof an extension of such cavity for forming the laterally extended intermediate portion of the article and a top-forming plunger having therein a cavity for forming the other shank portion of the article, which comprises first increasing the charge-receiving volume of the die cavity beyond the volume of that portion of the article which is to be formed therein by increasing the charge-receiving depth of the die cavity beyond the depth thereof at which the said cavity is effective regionally to form the said glass article from the charge, feeding to and wholly receiving in the die cavity a charge of molten glass substantially equal in volume to the volume of the finished article, press-molding the glass by restoring the die cavity to its effective charge-forming dimensions with a portion of the charge of molten glass extending above the said cavity, and forming the said article by rapidly relating the said top-forming plunger with the said die to move the upwardly extended portion of the charge into the cavity of the said plunger.

2. In the press-molding of a glass article which comprises a laterally extended intermediate portion with two end or shank portions extended oppositely therefrom; the herein-described method of molding such article in a mold assembly comprising a die having therein one shank-molding cavity and at the upper end thereof an extension of such cavity for forming the laterally extended intermediate portion of the article and a top-forming plunger having therein a cavity for forming the other shank portion of the article, which comprises first increasing the charge-receiving volume of the die cavity beyond the volume of that portion of the article which is to be formed therein by lowering a charge-supporting surface in the die cavity to thereby increase the charge-receiving depth of the die cavity beyond the depth thereof at which the said cavity is effective regionally to form the said glass article from the charge, feeding to and wholly receiving in the die cavity a charge of molten glass substantially equal in volume to the volume of the finished article, press-molding the glass by raising the charge-supporting surface of the die to restore the die cavity to its charge-forming dimensions with a portion of the charge of molten glass extending above the said cavity, and forming the said article by rapidly relating the said top-forming plunger with the said die to move the upwardly extended portion of the charge into the cavity of the said plunger.

3. In the press-molding of a glass article which comprises a laterally extended intermediate portion with two end or shank portions extended oppositely therefrom; the herein-described method of molding such article in a mold assembly comprising a die having therein one shank-molding cavity and at the upper end thereof an extension of such cavity for forming the laterally extended intermediate portion of the article and a top-forming plunger having therein a cavity for forming the other shank portion of the article, which comprises first increasing the charge-receiving volume of the die cavity beyond the volume of that portion of the article which is to be formed therein by lowering a charge-supporting surface in the die cavity to thereby increase the charge-receiving depth of the die cavity beyond the depth thereof at which the said cavity is effective regionally to form the said glass article from the charge, feeding to and wholly receiving in the die cavity a charge of molten glass substantially equal in volume to the volume of the finished article, press-molding the glass by raising the charge-supporting surface of the die to restore the die cavity to its effective charge-forming dimensions with a portion of the charge of molten glass extending above the said cavity, forming the said article by rapidly relating the said top-forming plunger with the said die to move the upwardly extended portion of the charge into the cavity of the said plunger, removing the said top-forming plunger from cooperative relation with the die, and raising the charge-supporting surface of the die beyond the charge-forming position thereof to elevate the molded article above the die.

4. In the press-molding of a glass article which comprises a laterally extended intermediate portion with two end or shank portions extended oppositely therefrom in a mold assembly comprising a die having therein one shank-molding cavity and at the upper end thereof an extension of such cavity for forming the laterally extended intermediate portion of the article, a bottom-forming plunger reciprocable in the said die cavity to provide the charge-supporting surface thereof and a top-forming plunger having therein a cavity for forming the other shank portion of the article; the herein-described method of molding such article which comprises first increasing the charge-receiving volume of the die cavity beyond the volume of that portion of the article which is to be formed therein by lowering the said bottom-forming plunger to thereby increase the charge-receiving depth of the die cavity beyond the depth thereof at which the said cavity is effective regionally to form the said glass article from the charge, feeding to and wholly receiving in the die cavity a charge of molten glass substantially equal in volume to the volume of the finished article, press-molding the glass by raising the bottom-forming plunger in the die cavity to restore the die cavity to its effective charge-forming dimensions with a portion of the charge of molten glass extending above the said cavity, and forming the said article by rapidly relating the said top-forming plunger with the said die to move the upwardly extended portion of the charge into the cavity of the said plunger.

5. In the press-molding of a glass article which comprises a laterally extended intermediate portion with two end or shank portions extended oppositely therefrom, in a mold assembly comprising a die having therein one shank-molding cavity and at the upper end thereof an extension of such cavity for forming the laterally extended intermediate portion of the article, a bottom-forming plunger reciprocable in the said die cavity to provide the charge-supporting surface thereof and a top-forming plunger having therein a cavity for forming the other shank portion of the article; the herein-described method of molding such article which comprises first increasing the charge-receiving volume of the die cavity beyond the volume of that portion of the article which is to be formed therein by lowering the said bottom-forming plunger to thereby increase the charge-receiving depth of the die cavity beyond the depth thereof at which the said cavity is effective regionally to form the said glass article from the charge, feeding to and wholly receiving in the die cavity a charge of molten glass substantially equal in volume to the volume of the finished article, press-molding the glass by raising the bottom-forming plunger in the die cavity to restore the die cavity to its effective charge-forming dimensions with a portion of the charge of the molten glass extending above the said cavity, forming the said article by rapidly relating the said top-forming plunger with the said die to move the upwardly extended portion of the charge into the cavity of the said plunger, removing the said top-forming plunger from cooperative relation with the die, and raising the bottom-forming plunger beyond its charge-forming position in the die cavity to elevate the molded article above the die.

ROBERT P. CASSELL.

REFERENCES CITED

The following references are of record in the file of this patent:

UNITED STATES PATENTS

| Number | Name | Date |
|---|---|---|
| 810,570 | Sages | Jan. 23, 1906 |
| 2,233,057 | Luce | Feb. 25, 1941 |

FOREIGN PATENTS

| Number | Country | Date |
|---|---|---|
| 501,865 | British | Mar. 7, 1939 |